United States Patent
Hudelson et al.

(10) Patent No.: US 6,690,428 B1
(45) Date of Patent: Feb. 10, 2004

(54) METHOD AND APPARATUS FOR EMBEDDING DIGITAL AUDIO DATA IN A SERIAL DIGITAL VIDEO DATA STREAM

(75) Inventors: Robert W. Hudelson, Grass Valley, CA (US); Charles S. Meyer, Nevada City, CA (US); Donald S. Lydon, Grass Valley, CA (US)

(73) Assignee: NVISION, Inc., Grass Valley, CA (US)

( * ) Notice: Subject to any disclaimer, the term of this patent is extended or adjusted under 35 U.S.C. 154(b) by 0 days.

(21) Appl. No.: 09/394,747

(22) Filed: Sep. 13, 1999

(51) Int. Cl.[7] .............................................. H04N 7/08
(52) U.S. Cl. ...................... 348/461; 348/473; 348/478; 348/479; 348/423.1; 348/462
(58) Field of Search ................................ 348/462, 461, 348/460, 484, 477, 473, 478, 479, 476, 465, 512, 515, 423.1, 211.5; 370/537, 535, 542; 386/96, 98, 99; 704/500, 502, 503

(56) References Cited

U.S. PATENT DOCUMENTS

| | | | | |
|---|---|---|---|---|
| 5,091,936 A | * | 2/1992 | Katznelson et al. | 380/237 |
| 5,208,666 A | * | 5/1993 | Elkind et al. | 348/192 |
| 5,335,073 A | * | 8/1994 | Yamamoto | 434/307 A |
| 5,357,284 A | * | 10/1994 | Todd | 348/486 |
| 5,483,538 A | | 1/1996 | Rainbolt | |
| 5,629,740 A | * | 5/1997 | Tanaka et al. | 348/515 |
| 5,757,416 A | * | 5/1998 | Birch et al. | 725/144 |
| 5,842,171 A | * | 11/1998 | Greenwood et al. | 704/500 |
| 5,910,822 A | * | 6/1999 | Yamaguchi et al. | 348/476 |
| 6,049,568 A | * | 4/2000 | Kagawa | 375/240.28 |
| 6,085,163 A | * | 7/2000 | Todd | 704/500 |
| 6,134,272 A | * | 10/2000 | Rim | 375/240.27 |
| 6,188,987 B1 | * | 2/2001 | Fielder | 704/501 |
| 6,233,253 B1 | * | 5/2001 | Settle et al. | 370/474 |
| 6,269,107 B1 | * | 7/2001 | Jong | 370/535 |
| 6,275,537 B1 | * | 8/2001 | Lee | 375/240.28 |
| 6,278,739 B2 | * | 8/2001 | Enomoto et al. | 375/240.26 |
| 6,418,140 B1 | * | 7/2002 | Matsui | 370/378 |
| 6,477,185 B1 | * | 11/2002 | Komi et al. | 370/536 |
| 6,493,357 B1 | * | 12/2002 | Fujisaki | 370/474 |
| 6,539,001 B1 | * | 3/2003 | Kato | 370/271 |
| 6,549,241 B2 | * | 4/2003 | Hiroi | 348/460 |
| 6,553,073 B1 | * | 4/2003 | Ogata | 375/240.28 |

OTHER PUBLICATIONS

Fibush, David K. "Integrating Digital Audio into the Serial Digital Video Signal," SMPTE Journal, Sep. 1994, pp. 574–579.

* cited by examiner

*Primary Examiner*—Michael H. Lee
*Assistant Examiner*—Jean W. Désir
(74) *Attorney, Agent, or Firm*—John Smith-Hill; Smith-Hill and Bedell

(57) ABSTRACT

Audio data of at least two audio data groups is embedded in an ancillary data space of a serial digital video data stream by multiplexing the audio data groups to provide a serial multi-group audio data stream, and inserting the serial multi-group audio data stream into the ancillary data space of the serial digital video data stream.

2 Claims, 7 Drawing Sheets

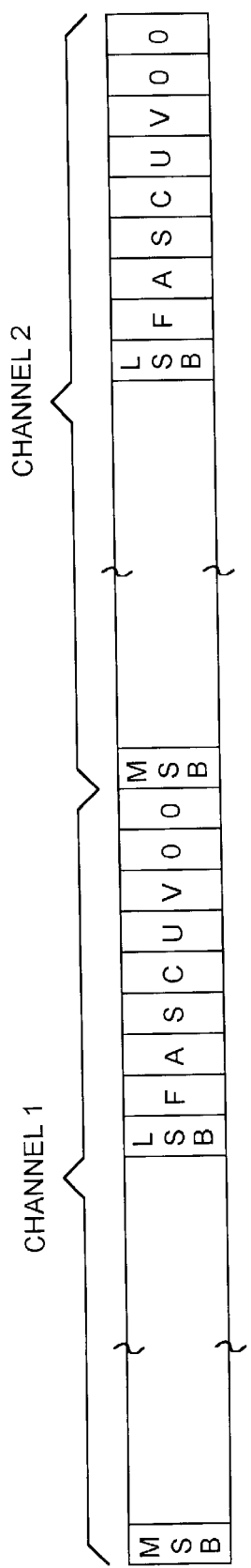
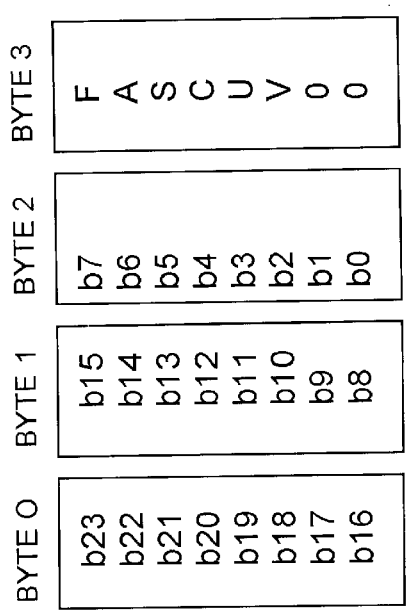
FIG. 4
FIG. 5

CHANNEL 1

| WORD 0 | WORD 1 | WORD 2 | WORD 3 |
|---|---|---|---|
| 0 | 1 | 1 | 1 |
| b23 | b15 | b7 | F |
| b22 | b14 | b6 | A or B |
| b21 | b13 | b5 | S |
| b20 | b12 | b4 | C |
| b19 | b11 | b3 | U |
| b18 | b10 | b2 | V |
| b17 | b9 | b1 | 0 |
| b16 | b8 | b0 | 0 |

CHANNEL 2

| WORD 0 | WORD 1 | WORD 2 | WORD 3 |
|---|---|---|---|
| 1 | 1 | 1 | 1 |
| c23 | c15 | c7 | F |
| c22 | c14 | c6 | A or B |
| c21 | c13 | c5 | S |
| c20 | c12 | c4 | C |
| c19 | c11 | c3 | U |
| c18 | c10 | c2 | V |
| c17 | c9 | c1 | 0 |
| c16 | c8 | c0 | 0 |

FIG. 6

CHANNEL 1

| WORD 0 | WORD 1 | WORD 2 |
|---|---|---|
| b9 | b18 | P |
| b8 | b17 | C |
| b7 | b16 | U |
| b6 | b15 | V |
| b5 | b14 | b23 |
| b4 | b13 | b22 |
| ch1 | b12 | b21 |
| ch0 | b11 | b20 |
| z | b10 | b19 |

CHANNEL 2

| WORD 3 | WORD 4 | WORD 5 | WORD 6 |
|---|---|---|---|
| c9 | c18 | P | ID |
| c8 | c17 | C | c3 |
| c7 | c16 | U | c2 |
| c6 | c15 | V | c1 |
| c5 | c14 | c23 | c0 |
| c4 | c13 | c22 | b3 |
| ch1 | c12 | c21 | b2 |
| ch0 | c11 | c20 | b1 |
| z | c10 | c19 | b0 |

METHOD AND APPARATUS FOR EMBEDDING DIGITAL AUDIO DATA IN A SERIAL DIGITAL VIDEO DATA STREAM

BACKGROUND OF THE INVENTION

This invention relates to a method and apparatus for embedding digital audio data in a serial digital video data stream.

SMPTE 259M-1993 (hereinafter referred to simply as SMPTE 259) defines the serial digital interface (SDI) signal format for video. In accordance with SMPTE 259, video is transmitted as 8-bit or 10-bit serial data at 143, 177, 270 or 360 Mb/s.

The SDI signal format allows a user of equipment that supports this standard to interconnect discrete items of equipment with the assurance that the different items are compatible with respect to the form in which video data is supplied or received by the respective items.

The SDI signal format specifies locations at which ancillary data can be accommodated in the field of a composite digital signal or a component digital signal. For convenience and brevity, the following description will focus on component digital signals. Much of the description is also applicable directly to composite digital signals. Those skilled in the art will recognize where the description is not applicable to composite digital signals and will understand how the description should be modified to render it applicable to composite digital signals.

ANSI S4.40 prescribes a data stream for digital audio data. The data stream, which is known as the AES-3 data stream, or simply the AES data stream, is composed of a succession of frames, each frame containing two subframes and each subframe containing 32 bit cells. Subframe 1 contains an audio data sample for audio channel 1 and subframe 2 contains an audio data sample for audio channel 2. The two channels of the AES data stream may be, but need not be, related, for example as left and right stereo channels. Referring to FIG. 1, each subframe contains a preamble of 4 bit cells, 4 bits of auxiliary data, 20 bits of sample data and 4 additional bits, which are referred to as V (validity), U (user), C (channel status) and P (parity). The four bits of auxiliary data may be used as added sample data space, allowing 24-bit samples, although the usual sample is 20 bits.

SMPTE 272M-1994 (hereinafter referred to simply as SMPTE 272) defines the mapping of AES digital audio data into the horizontal ancillary data, or HANC, space of the SDI data stream, resulting in a serial data stream including both video data and audio data. The horizontal ancillary data space has a preset range of word locations for ancillary data: for example, in the case of the component digital SDI signal format based on 525 lines, 29.97 frames per sec, the word locations are 1444–1711.

At the preferred 48 kHz audio sample rate, there are 1920 samples during one frame interval of a video signal having a 25 Hz frame rate and 1601.6 samples during one frame interval of a video signal having a 29.97 Hz frame rate. Thus, there are 3.072 audio samples per line interval for a 625 line, 25 Hz video signal and 3.051 audio samples per line interval for a 525 line, 29.97 Hz video signal. In order to provide a uniform distribution of audio samples throughout the frame of the composite audio-video data stream, three samples are placed in the HANC space of most lines of the video signal and four samples are placed in other lines. SMPTE standards specify that there should be no samples in the HANC space immediately following the switch line.

In accordance with SMPTE 272, sample data for one audio group, consisting of one or two AES digital audio data streams (each having two channels), is used to construct an audio data packet (or base packet) which is inserted in the HANC space on a given line. Referring to FIG. 2, in the case of digital composite video the first four words of the base packet are a data header, data ID, data block number and data count. There are then two or four channels, each containing an unspecified number of sets of three consecutive sample data words X, X+1 and X+2 (subject to a maximum of 255 user words). The final word of the base packet is a check sum. In the case of digital component video, the data header is three words long, but the structure of the base packet is otherwise the same.

The channels are organized in a sequence (e.g. 1, 2, 3, 4 in the case of four channels) and the sequence of channels repeats in the SMPTE 272 packet a number of times equal to the number of audio samples (typically three or four) to be accommodated by the SMPTE 272 packet. Each set of three consecutive sample data words X, X+1, X+2 represents one audio data sample.

A single data sample for one AES channel is derived from the 20 bits of sample data and the V, U and C bits of one AES subframe, and these twenty-three bits are mapped into the three consecutive sample data words X, X+1, X+2 of one channel of the SMPTE 272 packet. In the case of a group containing four channels, there are 36 sample data words (three samples*three words per sample*four channels) in the audio data packet if the packet contains three samples and there are 48 sample data words in the packet if the packet contains four samples.

The auxiliary data of two AES data streams of one audio group may be used to construct an extended data packet to be inserted in the HANC space on the same line as the base packet. The extended data packet is composed of a data header (one word or three words depending on whether the digital video is composite or component), data ID (one word), data block number (one word), data count (one word), an unspecified number of auxiliary data words, and a check sum (one word). The auxiliary data bits of the two AES subframes of one AES frame are mapped into one auxiliary data word of the extended data packet. The extended data packet for a given group immediately follows the base packet for that group and the number of auxiliary data words must match the number of samples in the base packet.

The ancillary data space of the SDI signal derived from a digital composite video signal is able to accommodate only one group (four digital audio channels, corresponding to two AES streams), whereas the ancillary data space of the SDI signal derived from a digital component video signal is able to accommodate four groups (sixteen digital audio channels, corresponding to eight AES streams). On each line that contains ancillary data, there is a base packet for each group and there is also an extended data packet for any group containing an AES data stream that includes auxiliary data.

The data ID of the base packet and extended data packet reflects the number of the group to which the two AES streams used to form the packets have been assigned.

Under SMPTE RP 165, an EDH (error detection and handling) packet may be included in the HANC space of one line per field. The EDH packet is inserted at the end of the HANC space. The embedder must take care to ensure that the EDH packet is not overwritten by audio packets, particularly in the case of the 270 Mb/s format where the HANC space is not large enough to support four groups of data with four samples per group as well as the EDH data.

In accordance with SMPTE 272, if a signal includes horizontal ancillary data, the ancillary data must start immediately after the EAV (end of active video) timing reference signal and all packets of ancillary data must be contiguous. Accordingly, there should be no ancillary data in the HANC space after the start of blanking.

A conventional device for embedding an audio group in an SDI video data stream operates by constructing the base packets (20 bits of audio data) and multiplexing the base packets into the digital video data stream immediately after the EAV timing reference signal. At the receiving end, the receiver detects the header of the audio data packet and controls a demultiplexer which extracts the ancillary data from the data stream, allowing the AES subframes to be reconstructed.

If the video data stream is able to accommodate more than one group, conventional embedders operate in cascade fashion. Thus, in the event that sixteen channels are to be embedded, a first embedder receives both the SDI data stream containing no ancillary data and audio data channels 1–4 and embeds the audio data channels into the serial digital video data stream to create a 1:4 (1 channel video, 4 channels audio) SMPTE 272 data stream and supplies the 1:4 data stream to the second embedder. The second embedder, which also receives audio channels 5–8, constructs an audio data packet containing audio channels 5–8 and multiplexes the audio data packets into the 1:4 data stream to provide a 1:8 SMPTE 272 data stream. The third and fourth embedders operate in similar manner to the second embedder, each adding four audio channels to provide, respectively, a 1:12 SMPTE 272 video data stream and the desired 1:16 SMPTE 272 video data stream.

This approach to embedding up to sixteen channels of audio data in the SDI video data stream is subject to disadvantage because it requires a full-functioned embedder for each group and does not allow the function of one embedder to be shared over several groups.

Further, there may be as much as 2 ms delay in each embedder. Therefore, if audio channels 1–4 are synchronized with audio channels 13–16 when the channels are provided to the first and fourth embedders respectively, channels 1–4 will delayed by as much as 6 ms relative to channels 13–16 in the final data stream because of the delay suffered by audio channels 1–4 in the first through third embedders. It is generally considered that a delay greater than 1 ms will produce objectionable loss of lip sync and therefore use of cascaded embedders requires careful synchronization of the audio channels.

If the time evolution of a sound field is converted to a data stream by employing microphones to generate a multi-channel electrical signal and digitizing the channels using sample clocks that are aligned in time, the several digital audio channels are said to be phase coherent. Loss of phase coherency by as little as one sample period in processing or propagating the multi-channel audio data stream can lead to a perceptible loss in audio image quality when the data stream is converted to analog form and used to drive loudspeakers for recreating the sound field.

The phase coherency of a multi-channel audio data stream is preserved when the data stream is embedded and disembedded provided the data stream is processed as one audio group. Conventional stereophonic audio requires only two channels, both of which can be included in one group, and accordingly phase coherency can be preserved over embedding and disembedding. However, some applications require use of more than four audio channels to create an audio image and this requires use of more than one audio group for embedding the multi-channel audio data stream. Conventional embedders cannot assure that phase coherency is preserved across groups.

SUMMARY OF THE INVENTION

In accordance with a first aspect of the invention there is provided a method of embedding audio data of at least two audio data groups in an ancillary data space of a serial digital video data stream, comprising multiplexing the audio data groups to provide a serial multi-group audio data stream, and inserting the serial multi-group audio data stream into the ancillary data space of the serial digital video data stream.

In accordance with a second aspect of the invention there is provided apparatus for embedding at least two audio data groups in an ancillary data space of a serial digital video data stream, comprising an embedder for formatting data of a first audio data group, generating data packets from the formatted data and inserting the data packets into the digital video data stream, and an expansion device for formatting data of a second audio data group and supplying formatted data to the embedder, and wherein the embedder generates data packets from the formatted data of the second audio data group and inserts the data packets into the digital video data stream.

In accordance with a third aspect of the invention there is provided a method of embedding ancillary data in an ancillary data space of a serial digital interface video stream, wherein each line of the video stream is composed of a horizontal ancillary data space followed by an active interval, said method comprising during the horizontal ancillary space of line n of the video stream, reading all data from a video FIFO, whereby at the start of the active interval of line n+1 of the video stream the video FIFO contains no data, during the active interval of line n, preparing an ancillary data packet and loading the data packet into the video FIFO, during the horizontal ancillary data space of line n+1 of the video stream, reading all data from the video FIFO and inserting the ancillary data packet into the horizontal ancillary data space of line n+1, whereby at the start of the active interval of line n+2 of the video stream the video FIFO contains no data.

In accordance with a fourth aspect of the invention there is provided a method of processing multiple audio data In streams, comprising writing the first and second audio data streams into respective FIFOs, reading the audio data streams from the respective FIFOs, combining the data streams read from the FIFOS, periodically testing depth of data in each FIFO, and forcing the depth of data in each FIFO to a selected value.

In accordance with a fifth aspect of the invention there is provided a method of embedding ancillary data in the horizontal ancillary data space of a serial digital video stream, wherein each line of the video stream is composed of a horizontal ancillary data space followed by an active interval, said method comprising receiving the input serial digital video stream, detecting whether ancillary data is embedded in the horizontal ancillary data space of the input serial digital video stream, if no ancillary data is embedded in the input serial digital video stream, embedding ancillary data in the serial digital video stream, if ancillary data is embedded in the input serial digital video stream, operating either in a cascade mode or in an originate mode, and wherein operating in the originate mode includes the step of embedding ancillary data in the horizontal ancillary data space of the serial digital video stream by overwriting data in the input serial digital video stream, and operating in the cascade mode includes the step of embedding ancillary data in the serial digital video stream without overwriting data in the input serial digital video stream.

In accordance with a sixth aspect of the invention there is provided apparatus for disembedding at least two audio data groups from an ancillary data space of a serial digital video data stream, comprising a disembedder for reading data packets of at least two groups from the digital video data stream, formatting packet-wise data of a first audio data group as sample-wise data and outputting the sample-wise data of the first audio data group, and an expansion device for receiving packet-wise data of a second audio data group from the disembedder, formatting packet-wise data of the second audio data group as sample-wise data and outputting the sample-wise data of the second audio data group.

BRIEF DESCRIPTION OF THE DRAWINGS

For a better understanding of the invention, and to show how the same may be carried into effect, reference will now be made, by way of example, to the accompanying drawings, in which FIG. 4 illustrates the structure of a serial audio data stream derived from the AES audio data stream internally of the embedder shown in FIG. 3, FIG. 5 illustrates the structure of 8-bit parallel data derived from the serial audio data stream shown in FIG. 4, FIG. 6 illustrates the structure of 9-bit parallel data derived from the 8-bit parallel data shown in FIG. 5, FIG. 7 illustrates the structure of sample data in an audio data packet derived from the 9-bit parallel data shown in FIG. 6.

DETAILED DESCRIPTION

Figures 1, 2:
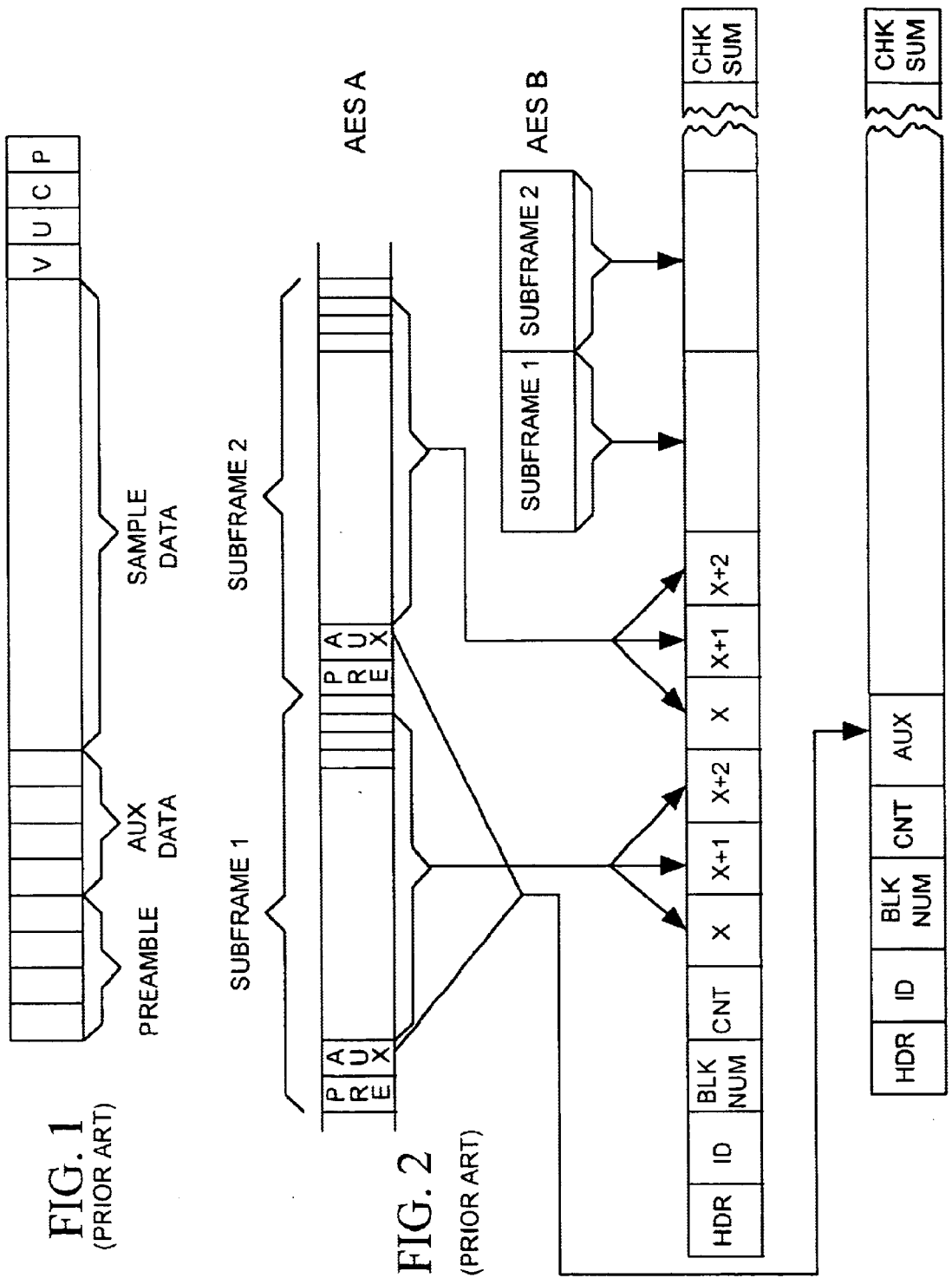
FIG. 1 illustrates the structure of the AES audio data subframe.
FIG. 2 illustrates mapping of AES audio data into a data packet for including in the HANC space of the SDI signal.
Figure 3:
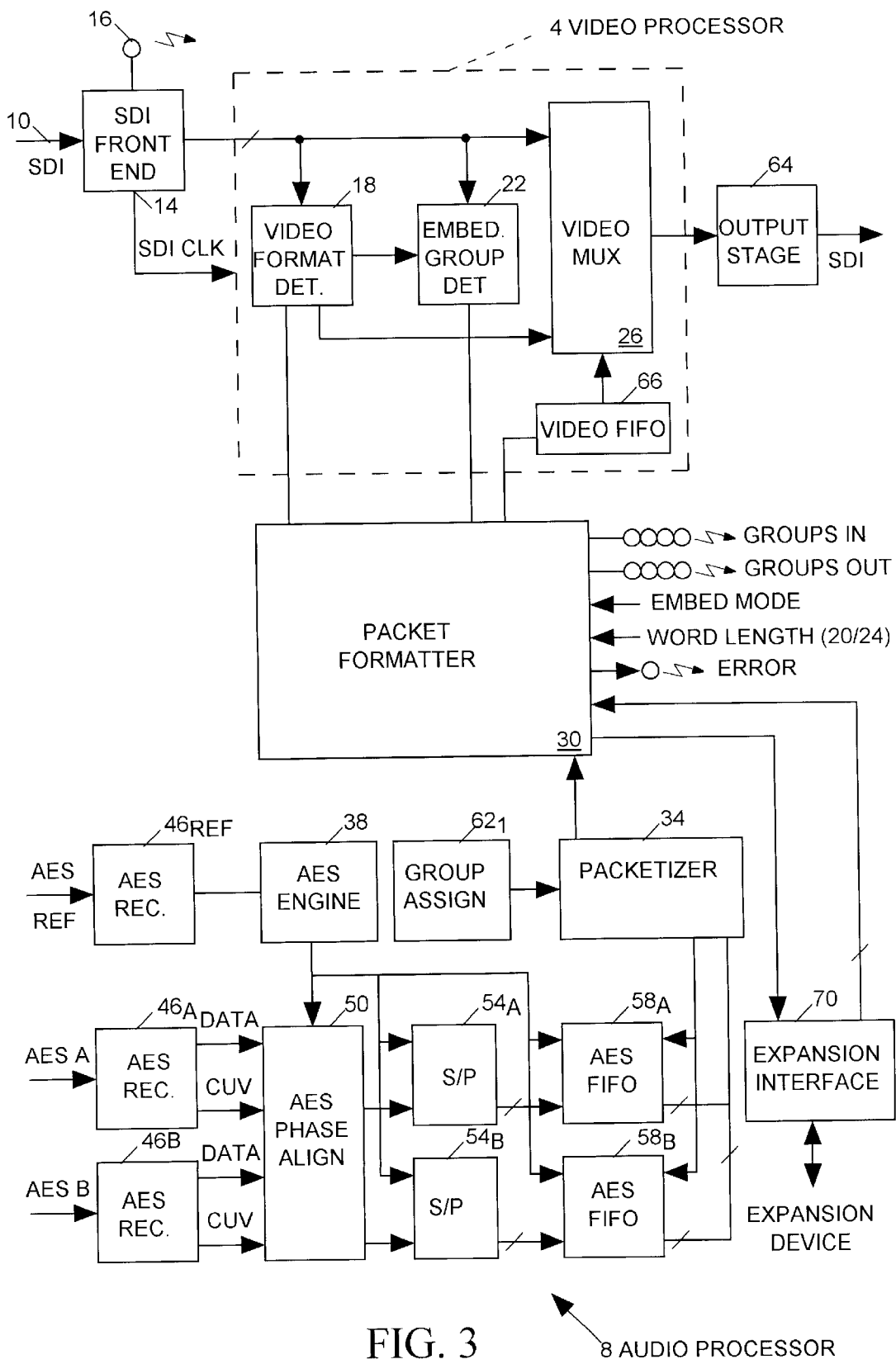
FIG. 3 is a block diagram of an embedder for embedding up to four audio channels in a serial digital video data stream.

The embedder shown in FIG. 3 has two main functional blocks, namely a video processor 4 and an audio processor 8. The video processor 4 includes a video format detector 18, an embedded group detector 22 and a video multiplexer 26. The audio processor includes a packet formatter 30, a packetizer 34 and an AES engine 38.

A 10-bit SDI video signal is received at an input terminal 10 which supplies the SDI signal to an SDI front end 14. The SDI front end 14 includes a cable equalizer which compensates for frequency dependent attenuation of the signal, an SDI receiver which extracts a clock signal SDI CLK from the SDI video signal and provides as output the serial video data stream, and a presence detector which provides a signal to energize an LED 16 to indicate that an SDI video signal is being received. The SDI front end also includes a descrambler which descrambles the serial data stream and a deserializer which receives the descrambled serial digital data stream and provides a 10-bit parallel output signal. The functional components of the SDI front end are not separately shown because they may be of conventional type. The 10-bit parallel output signal of the SDI front end is supplied to the video processor 4.

The video format detector 18 examines the output signal of the SDI front end 14 and determines the format of the video signal from which the SDI signal was derived. Based on the format of the video signal, the format detector 18 provides a flag HANC START to the embedded group detector 22 signifying the start of the ancillary data space for the current line, a HANC END signal to the packet formatter 30, signifying the end of the ancillary data space for the current line, and a SAMPLE NUMBER signal to the packet formatter 30 indicating, on the basis of the particular format that has been detected and the current line number, whether zero, three or four audio data samples should be included during the HANC space of the next line of the video signal.

The embedded group detector 22 uses the HANC START flag to examine the ancillary data space of the video data stream and determine whether it already contains ancillary data. If the embedded group detector detects ancillary data, it examines the data ID in the data header of each packet and provides a signal to the packet formatter 30 indicating which, if any, groups it has detected. The packet formatter responds to the signal provided by the embedded group detector by energizing Groups In LEDs 42 to indicate the group number(s) of the detected ancillary data.

The embedder shown in FIG. 3 has three AES receivers $46_A$, $46_B$ and $46_{ref}$ for receiving respective AES audio signals AES A, AES B and AES REF each having a 48 kHz sampling rate. The signals received by the receivers $46_A$ and $46_B$ contain active audio data whereas the signal received by the receiver $46_{ref}$ is a reference signal of which the data content is unimportant. For example, the reference signal may contain AES silence, in which case each sample value in each channel is zero. The AES receiver $46_{ref}$ extracts the reference clock signal AES CLK from the AES reference signal and provides the reference clock signal to the AES engine 38, which generates suitable timing signals to control processing of the AES A and AES B signals. The AES engine supplies the reference clock signal AES CLK to the clock input of an AES phase aligner 50.

Each receiver $46_A$ or $46_B$ extracts the clock signal from its AES input signal, recovers the audio data and demultiplexes the audio data and the control bits C, U and V.

The receivers $46_A$ and $46_B$ supply the audio data to respective inputs of the AES phase aligner 50. The AES phase aligner 50 reclocks the digital audio data provided by the receivers $46_A$ and $46_B$ to generate respective reclocked serial audio data streams which are in phase with the AES reference signal and hence in phase with each other. The reclocked serial audio data stream does not include the preamble of the AES data stream. The phase aligner 50 reinserts the control bits C, U and V in each serial data stream and adds control bits F, A and S. See FIG. 4. The control bit F is set at 1. The control bit A is 1 for channel 1 and zero for channel 2. The control bit S is equal to Z and is 1 for the start of a block and is otherwise zero.

The AES phase aligner 50 provides the two reclocked serial audio data streams to respective serial in, parallel out shift registers $54_A$ and $54_B$, which convert the serial data to 8-bit parallel data. The structure of the 8-bit parallel data is shown in FIG. 5. Each AES sample is represented by four consecutive bytes. Two consecutive subframes are represented by an 8 byte sample sequence.

The shift registers 54 supply the 8-bit parallel digital audio data to respective AES FIFO memories $58_A$ and $58_B$ under control of the AES engine 38. The FIFO memories $58_A$ and $58_B$ are 9 bits wide. The 8-bit parallel-data is loaded into the lower bits of the FIFO memories and an additional sync bit is stored in the ninth bit location. The sync bit is set by the AES engine 38 and indicates the start of an 8-byte sequence. The sync bit is zero for byte zero of channel 1 and is otherwise 1, which makes it possible for the packetizer 34 to locate the first word of an 8-word sample sequence. The FIFO memories 58 are 256 bits deep, which provides for 32 samples of storage (256 bits/(two channels*four words per channel)).

A group assignment switch $62_1$ connected to the packetizer 34 allows the user to specify the group assignment of AES A and AES B. The rotary switch $62_1$ has four settings, for groups 1, 2, 3 and 4 respectively, and a fifth setting (OFF) in which AES A and AES B will not be embedded. The packetizer uses the group assignment to generate a data ID value in accordance with SMPTE 272.

At the start of the active interval of line n, the packet formatter 30 issues a command to the packetizer 34 to read audio sample data from the FIFOs 58 and create SMPTE 272 format data words and also issues a command to the packetizer indicating the number of samples (zero, three or four) to be included on line n+1.

The packetizer 34 reads alternately and repeatedly, at the AES clock rate, eight words (one sample of channel 1 and one sample of channel 2) from the FIFO $58_A$ and eight words from the FIFO $58_B$. FIG. 6 represents one such sequence of eight words. In FIG. 6, the data bits for channel 1 have the prefix b and the data bits for channel 2 have the prefix c. The packetizer separates the auxiliary data (bits b0–b3 for channel 1, c0–c3 for channel 2) from the base data (bits b4–b23 for channel 1, c4–c23 for channel 2) and organizes the base data for channels 1 and 2 as six 9-bit words (FIG. 7A) and the auxiliary data for channels 1 and 2 as one 9-bit word (FIG. 7B). In FIG. 7A, P is a parity bit. In FIG. 7B, ID is a channel pair identifier: ID is 0 for AES A and is 1 for AES B. The data format shown in FIGS. 7A and 7B corresponds to the audio data structure and the extended data structure, respectively, of SMPTE 272, except that the data words prescribed in SMPTE 272 are ten bits rather than the nine bits shown in FIGS. 7A and 7B. However, there is no loss of information because bit 10 of the SMPTE 272 word can be derived from bit 9 and whether the word is a data header word.

Assuming that the packet formatter 30 calls for four samples, the packetizer reads four 8-word sample sequences from each FIFO 58, organizes the data as SMPTE 272 format words, and groups the SMPTE 272 format words in packets, which are referred to herein as internal packets to distinguish from transmission packets which are created by the packet formatter 30. That is to say, the packetizer generates an internal base packet, with data header, data ID, block number, data count and sample data, and an internal extended data packet which follows the internal base packet. The sample data of the internal base packet is the base data for sample 1 of AES A, channel 1, followed by the base data for sample 1 of AES A, channel 2, the base data for sample 1 of AES B, channel 1, the base data for sample 1 of AES B, channel 2, the base data for sample 2 of AES A, channel 1, and so on to sample 4 of AES B, channel 2. Similarly, the sample data for the internal extended data packet is the extended data for sample 1 of AES A, channels 1 and 2, followed by the extended data for sample 1 of AES B, channels 1 and 2, the extended data for sample 2 of AES A, channels 1 and 2, and so on to sample 4 for AES B, channels 1 and 2.

If the packet formatter calls for three samples, the packetizer reads only three samples of each channel from the FIFO memories 58 but nevertheless constructs internal packets containing four samples, by repeating the data for sample 3 (base and extended) as sample 4, so that the number of words in the internal base and extended data packets is the same regardless of the number of samples called for by the packet formatter.

If the packet formatter calls for zero samples, e.g. because the current line is the switch line, the packetizer does not read samples from the FIFO memories and does not create internal packets.

Whether the packet formatter calls for samples does not depend on whether data is to be inserted in the SDI data stream: the SAMPLE NUMBER signal is simply an indication of the number of samples that should be inserted on the next line based on video signal format and line number. Whether the AES group is to be inserted depends on whether the group assignment switch selects a group number or OFF and on the embed mode, which will be discussed below.

The packetizer always creates internal base packets if the embedder is receiving the AES reference signal AES REF regardless of whether the AES receivers $46_A$ and $46_B$ are receiving AES audio signals. Further, the packetizer generates internal extended data packets even when the audio sample data is 20 bits and not 24 bits.

The packetizer supplies the internal base packets and the internal extended data packets to the packet formatter. Because the number of words in an internal packet is the same regardless of whether the SAMPLE NUMBER command is three or four, the packetizer need supply only a fixed number of words to the packet formatter, and there is no uncertainty over whether the proper number of words has been supplied.

The packet formatter creates a transmission base packet containing the elements of the internal base packet (data header, packet ID, block number, count and three or four audio data samples, depending on the SAMPLE NUMBER command) and the proper check sum. In the event that the SAMPLE NUMBER command calls for only three samples, the packet formatter normally truncates the packet and discards the repeated third sample. The packet formatter also creates a transmission extended data packet containing the elements of the internal extended data packet and the proper check sum. The transmission packets are in accordance with SMPTE 272 except that the words are of nine bits instead of ten.

The packet formatter writes the nine-bit transmission packets for line n into the video FIFO during the active interval of line n−1.

During the HANC space of line n, the video multiplexer 26 reads the nine-bit transmission packets for line n from the video FIFO at the parallel video clock rate using the SDI CLK generated by the SDI front end. The video processor 4 includes a circuit which determines whether each word is a data header word based on the value of the word and the location of the word in the packet, calculates bit 10 based on the value of bit 9 and whether the word is a data header word, and supplies bit 10 to the video multiplexer. The video multiplexer 26 merges the ten-bit SMPTE 272 format packets with the incoming ten-bit parallel video data, received from the SDI front end, to produce a new video data stream which includes the SMPTE 272 data packets, using the data ID to specify the proper address in the HANC space. At the end of the HANC space of line n, the video FIFO is empty. Consequently, the first word read from the video FIFO on line n+1 is unambiguously the first word to be inserted in line n+1. Thus the illustrated embedder operates in a line oriented mode, which is to say that the packet formatter generates audio data packets for one line of the video signal and supplies the packets to the video FIFO before starting to generate packets for the next line of the video signal, rather than supplying packets continuously to the video FIFO.

Once the video FIFO has been emptied and the data has been inserted into the parallel video stream, the remainder of the HANC area is blank in accordance with SMPTE 125M, except for an EDH packet once per field.

Nine bit words are generated by the packet formatter because it is convenient to use a nine bit video FIFO for supplying the packets to the video processor. The video FIFO is 512 words deep, which provides enough memory for the horizontal ancillary data space of a complete line.

The video processor 4 provides the resulting parallel data stream to an output stage 64 which includes a serializer and scrambler which scrambles the data signal and converts it to serial form, and a cable driver which provides an SDI video signal in accordance with SMPTE 259 for onward transmission.

It is preferred that the 48 kHz AES reference clock be clock locked to the video clock, in which case there are exactly 1920 samples during one frame of a 25 Hz video signal and 8008 samples during five frames of a 29.97 Hz video signal. If, however, the AES reference clock is not clock locked to the video clock, it might be necessary to drop samples or repeat samples in order to avoid loss of synchronism between the audio material and the video material yet keep the correct number of samples per frame. In particular, if the 48 kHz reference clock is not clock locked to the video clock, there is a possibility of a clock slip, such that the AES clock falls behind the video clock. In this case, the AES FIFO might supply only 1919 samples during the frame interval of a 25 Hz video signal so that on a particular line that requires four samples, only three samples will be available. In this event, the packet formatter will not truncate the packet and will instead load the words of a four-sample packet into the video FIFO. Conversely, if the AES FIFO supplies excess samples, the packetizer will selectively omit a sample.

Although the packetizer always generates internal extended data packets, the operator can select whether to insert extended data packets, containing AES auxiliary data, in the video data stream. This selection is accomplished by a front panel switch which provides the operator with a choice of embedding 20 or 24 bit AES words. If the operator selects 20 bit words, the packet formatter does not supply the extended data packets to the video FIFO 66, and AES auxiliary data is not inserted.

The embedder can operate in either of two modes, which are referred to herein as originate and cascade respectively. When the embedder operates in the originate mode, it inserts the data packets in the horizontal ancillary data space regardless of whether there was any ancillary data in the incoming video stream. Any ancillary data in the incoming video stream is overwritten. In the cascade mode, which is generally applicable only if the case of component video, the embedder inserts ancillary data at the end of the ancillary data present in the incoming video stream. The embedded group detector detects the end of the ancillary data and provides a signal to the packet formatter indicating how much space is available in the HANC space. If there is insufficient space remaining in the HANC space for all the audio data, a portion of the audio data is inserted into the available HANC space and an error indication is provided to the operator.

If the cascade mode is selected, there is a possibility of conflict between the group number of the data embedded in the incoming video stream and the group number selected by the user with the group assignment switch $62_1$. If the packet formatter detects a conflict, it energizes the error LED.

In the event that the input digital video signal is a digital component video signal, the ancillary data space is sufficiently large to accommodate six additional AES channel pairs. In this case, the embedder shown in FIG. 3 is used in conjunction with the expansion device shown in FIG. 8.

The expansion device includes an audio processor 8X which is connected to the audio processor 8 via an embedder interface 70X in the expansion device and a corresponding expansion interface 70 in the embedder. The expansion and embedder interfaces supply the AES reference clock to the audio processor 8X. The audio processor 8X also includes an AES engine 38X, which receives the AES reference clock signal from the embedder interface 70X and has a similar function to the AES engine 38 of the audio processor 8.

The expansion device has six AES receivers $46_C$–$46_H$, which receive respective AES data streams AES C–AES H and provide the audio data to respective inputs of an AES phase aligner 50X. The phase aligner 50X receives the AES reference clock signal from the embedder interface 70X and resynchronizes the digital audio data and provides six serial digital audio data streams synchronized with the reference clock to respective serial-to-parallel converters $54_C$–$54_H$. The serial-to-parallel converters $54_C$–$54_H$ convert the respective serial digital audio data streams to 8-bit parallel data and provide the parallel data to respective FIFO memories $58_C$–$58_H$, similarly to the manner in which the serial-to-parallel converters $54_A$ and $54_B$ provide parallel data to the AES FIFO memories $58_A$ and $58_B$. As in the case of the FIFO memories $58_A$ and $58_B$, the FIFO memories $58_C$–$58_H$ are 9 bits wide and a sync bit is stored in the ninth bit location. The sync bit is zero for byte zero of channel 1 and is otherwise 1.

The expansion device also includes a packetizer 34X which operates in similar manner to the packetizer 34 shown in FIG. 3. The packetizer 34X reads sequentially and repeatedly, at the AES clock rate, eight words from the FIFOs $58_C$–$58_B$. The packetizer 34X organizes the base data and extended data for each pair (AES C and AES D, AES E and AES F, AES G and AES H) as internal base and extended data packets and supplies the internal packets to the packet formatter 30 through the embedder interface 70X and the expansion interface 70.

The operator interface of the expansion device includes three group assignment switches for assigning the three AES channel pairs AES C/D, AES E/F and AES G/H to respective groups. The data ID of each internal packet supplied to the packet formatter 30 by the packetizer 34X reflects the group to which the channel pair has been assigned by its group assignment switch.

The packet formatter receives the internal packets provided by the packetizer 34 and the internal packets provided by the packetizer 34X and checks the group assignments of the packets received from the packetizer 34X against the group assignment of the packets received from the packetizer 34 and energizes an assignment error LED in the event of a conflict, i.e. two or more AES channel pairs being assigned to the same group.

Assuming that there is no conflict, the packet formatter creates transmission base and extended data packets from the internal packets received from the packetizer 34 and from the packetizer 34X and provides the nine-bit transmission packets to the video FIFO 66. Operation of the video processor corresponds to that described above.

Since the AES engine 38 and the AES engine 38X operate under control of the same clock signal, the embedder and the embedder expansion device do not disrupt phase coherency across groups. Thus, if a sample of channel 1 of AES A is aligned in time with a sample of channel 1 of AES C, the corresponding samples will be located at equivalent positions in the proper SMPTE 272 packets, and the two packets will be embedded on the same line of the digital component video signal.

Figure 9:
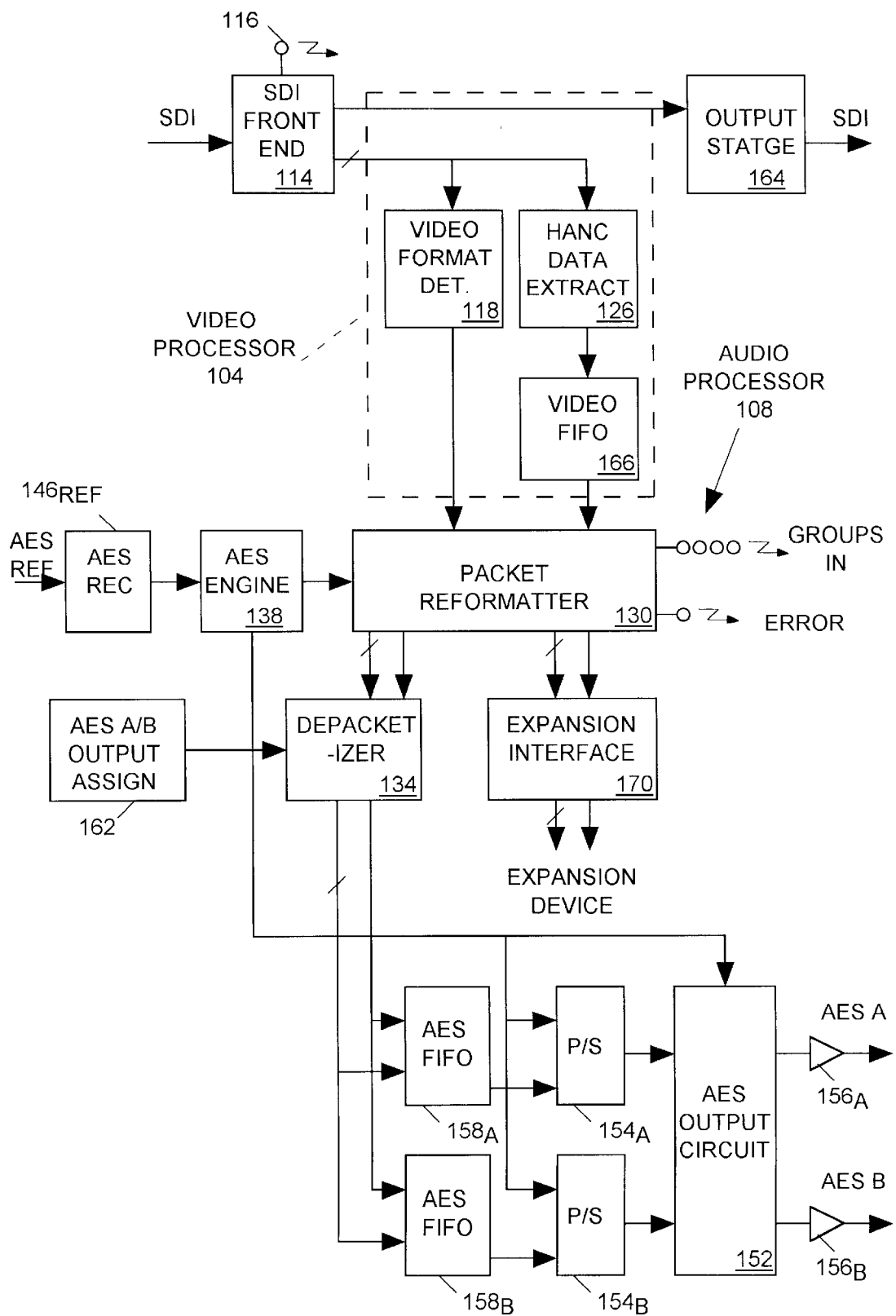
FIG. 9 is a block diagram of a disembedder for disembedding up to four audio channels.

The disembedder shown in FIG. 9 is able to remove an AES audio group from a composite audio-video SDI data stream. Similarly to the embedder shown in FIG. 3, the disembedder shown in FIG. 9 includes a video processor 104 and an audio processor 108. The video processor 104 includes a video format detector 118 and a HANC data extractor 126. The audio processor 108 includes a packet reformatter 130, a depacketizer 134 and an AES engine 138.

A ten-bit SDI data stream including embedded audio data is received at an input terminal 110 which supplies the SDI data stream to an SDI front end 114. The SDI front end 114 includes a cable equalizer, a reclocker which reclocks the SDI data stream to the received clock frequency, typically 270 MHz, and provides as output the serial video data stream and a clock signal SDI CLK at the received frequency, and a presence detector which provides a signal to energize an LED 116 to indicate that an SDI data stream is being received. The SDI front end supplies the reclocked serial video data stream to an output stage 164, including a cable driver. The SDI front end 114 also includes a descrambler which descrambles the serial video data stream and a deserializer which receives the descrambled serial video data stream and provides a 10-bit parallel output signal. The functional components of the SDI front end are not separately shown because they may be of conventional type. The 10-bit parallel output signal of the SDI front end is supplied to the video processor 104.

The disembedder includes an AES receiver $146_{ref}$ for receiving a reference AES audio signal having a 48 kHz sampling rate. The AES receiver $146_{ref}$ extracts the reference clock signal AES CLK from the AES reference signal. Alternatively, the disembedder may include a local AES reference generator which receives the clock signal SDI CLK and uses it to synthesize the reference clock signal AES CLK. The user can select either the reference clock signal provided by the AES receiver $146_{ref}$ or the reference clock signal derived from the clock signal SDI CLK. In either case, the selected reference clock signal AES CLK is provided to the AES engine 138, which generates suitable timing signals for purposes to be described later. The AES engine supplies the selected reference clock signal AES CLK to the clock input of an AES output circuit 150.

The video format detector 118 examines the output signal of the SDI front end 114 and determines the format of the video signal from which the SDI signal was derived. Based on the format of the video signal, the format detector 118 asserts a signal HANC AREA during the horizontal ancillary data space of the current line. The HANC data extractor 122 responds to the HANC AREA signal by locating the data ID of the base packet and supplying the lower nine bits of each word in the horizontal ancillary data space to a video FIFO 166.

The video FIFO 166 accommodates the data read from the horizontal ancillary data space during one line interval of the SDI signal. During the active interval of that line, the packet reformatter 130 reads all the data from the video FIFO, so that the FIFO will be empty at the start of the horizontal ancillary data space of the next line, and processes that data.

Because the disembedder employs line oriented processing, information regarding the start of the header of a packet read from the HANC space is unambiguously available in the format of the data written into the video FIFO, without regard to the tenth bit of the data words. Consequently, a 9-bit video FIFO can be used without risk of loss of information regarding the location of the base data or the extended data.

If the data read from the horizontal ancillary data space was derived from a single AES audio group that had been embedded in the SDI data stream in accordance with SMPTE 272, the data read from the video FIFO 166 during the active interval of one line will have the structure of one nine-bit SMPTE 272 format base packet and possibly one nine-bit SMPTE 272 format extended data packet, as described above with reference to FIGS. 7A and 7B. The base packet and the extended data packet contain the data for three or four samples of two or four AES channels. If no extended data is present, the data words have the same structure but the data bits of the extended data word are set to zero. The packet reformatter temporarily stores the base data and concatenates the base data with the extended data (if present) and generates a packet in which the data and control bits of each pair of samples are organized in the AES format shown in FIG. 6. It will be recognized that although the data and control bits are in an AES format, the packet contains multiple samples for each channel. The sample data occupies the lower eight bits of each word and the reformatter adds a sync bit as bit nine. In each group of eight consecutive words between the data count and check sum, the sync bit is zero for the first word and one for the other seven words. It will be understood that in each sequence of sixteen consecutive words, the first group of eight words contains the data for one frame of one AES data stream and the second group of eight words contains the data for one frame of the other AES data stream. Consequently, a complete four-channel sample is made up of sixteen consecutive words. The packet reformatter supplies the AES-format packet to the depacketizer 134.

The disembedder includes an output assignment switch 162 which selects a group number of the ancillary data to be processed in the depacketizer 134. In the configuration shown in FIG. 9, where the SDI data stream is digital composite video and accordingly only supports one AES group, the output assignment switch will normally select group 1. If the group number included in the AES-format packet supplied to the depacketizer matches the group number selected by the output assignment switch 162, the depacketizer places the sixteen words representing a four-channel sample successively on the depacketizer's output bus 136. Operating under control of timing signals generated by the depacketizer based on the SDI clock, the AES FIFOs $158_A$ and $158_B$ read the bus 136 so that the channel 1 and channel 2 data for one AES channel pair is loaded into the FIFO $158_A$ and the channel 1 and channel 2 data for the other AES channel pair is loaded into the FIFO $158_B$, thereby separating the two AES channel pairs. In this manner, the packet-wise data is converted to sample-wise data.

The sync bit is used to coordinate reading of the FIFOs 158, which are 256 bits (32 AES samples) deep. Specifically, the AES engine examines the output data of the AES FIFOs to ensure that the sample boundaries, defined by the sync bit being zero, are aligned. The nine-bit data words are read from the AES FIFOS, the sync bits are stripped and the 8-bit sample-wise output data having the structure shown in FIG. 5 is supplied to a parallel-in, series-out shift register 154 under control of the AES engine 138.

The parallel data loaded into the shift register 154 is read out in series and is supplied to the AES output circuit 152, which brings the data into phase alignment with the AES reference, inserts the C bits and creates the Z preambles, and supplies the data stream to suitable drivers 156 which supply output signals in accordance with the AES standard.

The mode of operation of the embedder shown in FIG. 3 ensures that the audio material and the video material in the SDI signal provided by the output stage 64 are synchronized such that, for example, in the case of 29.97 Hz video material, there are exactly 8008 samples of audio material during five frames of video material. However, some embedders do not ensure synchronism, and such an embedder might produce an SDI signal in which there are fewer than 8008 samples during some five-frame periods and more than 8008 samples during other five-frame periods. Loss of synchronism affects the depth of data in the AES FIFOs 158, and the depacketizer monitors the depth of data stored in the FIFOs 158 to detect loss of synchronism between the audio material and the video material. If the depacketizer detects that the data is too deep or too shallow, it drops a sample or repeats a sample as needed to maintain the proper depth of data.

The output assignment switch 162 can also select silence. If the switch 162 selects silence, the drivers 156 supply AES silence regardless of the data supplied by the HANC data extractor 126.

Figure 10:
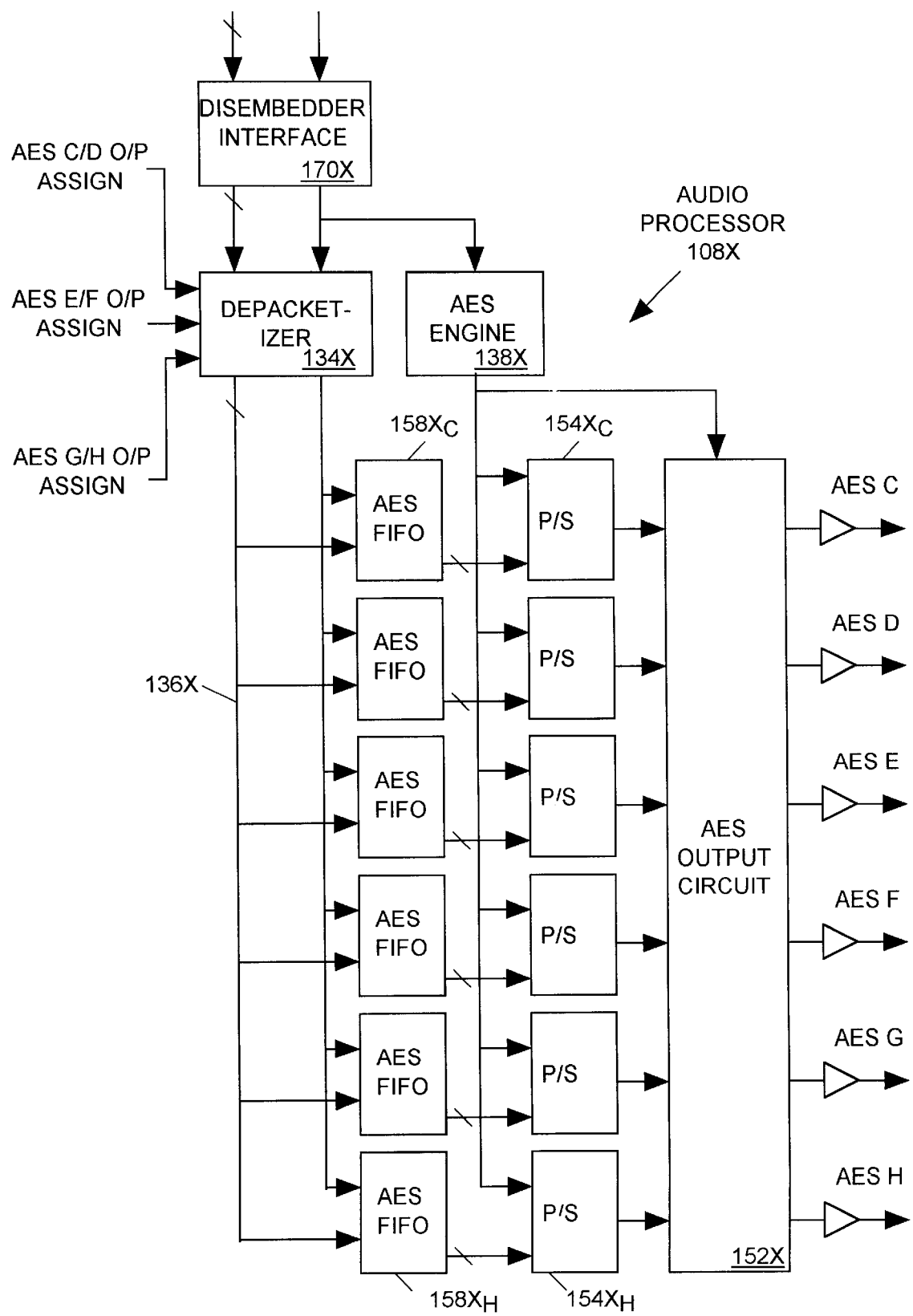
FIG. 10 is a block diagram of an expansion device for allowing the disembedder shown in FIG. 9 to disembed up to sixteen audio channels.

In the event that the disembedder is used in an environment in which the SDI data stream might be derived from a digital component video signal, and could therefore accommodate more than one AES group, the disembedder is used in conjunction with the expansion device shown in FIG. 10. The expansion device includes an audio processor 108X which is connected to the audio processor 108 of the disembedder via a disembedder interface 170X in the expansion device and a corresponding expansion interface 170 in the disembedder. The reformatter 130X provides AES-format packets both to the depacketizer 134 and to the depacketizer 134X through the expansion and embedder interfaces. The expansion and embedder interfaces supply the AES reference clock to the audio processor 108X. The audio processor 108X includes an AES engine 138X, which operates under control of the selected reference clock signal AES CLK and has a similar function to the AES engine 138 of the audio processor 108.

The depacketizer 134X and the AES FIFOs 158X operate in similar fashion to the depacketizer 134 and AES FIFOs 158, separating the packet-wise data of a group whose number matches the group number selected by an output assignment switch and placing the packet-wise data on the output bus 136X for reading by the AES FIFOs assigned to the particular group and thereby converting the packet-wise data to sample-wise data. The shift registers 154X convert the parallel sample-wise data to serial form and supply the serial data to an AES output circuit 152x which performs analogous functions to the AES output circuit 152.

Because the depacketizers 134 and 134X operate under control of the same clock signal, the disembedder and the disembedder expansion device do not disturb phase coherency across groups. Thus, two samples at equivalent positions in the SMPTE 272 packets extracted from the same line of the digital component video signal will result in samples that are aligned in time in the appropriate AES data streams. Therefore, in the event that the embedder and disembedder system described with reference to FIGS. 3, 8, 9 and 10 is used to propagate an audio signal having more than four channels, phase coherency is preserved across the channels.

Figure 8:
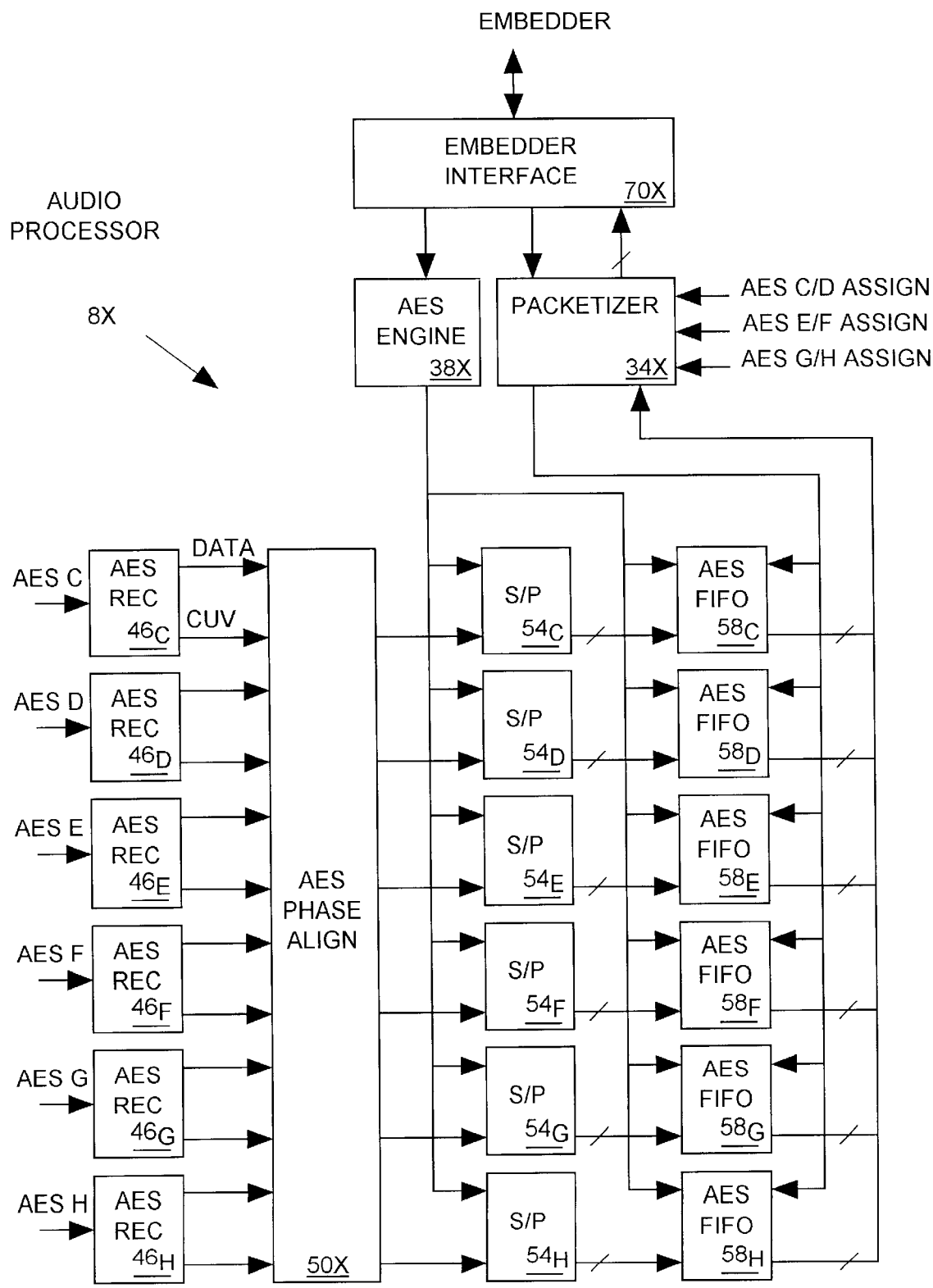
FIG. 8 is a block diagram of an expansion device for allowing the embedder shown in FIG. 3 to embed up to sixteen audio channels.

In a video production facility, an embedder as shown in FIG. 3 and an embedder expansion device as shown in FIG. 8 may be connected to supply an SDI data stream containing multiple audio groups to a disembedder as shown in FIG. 9 connected to a disembedder expansion device as shown in FIG. 10. The output assignment switches of the disembedder and disembedder expansion device are set to recover the particular audio groups embedded by the embedder and embedder expansion device. If the embedded multigroup data is phase coherent on a packet-by-packet basis, there will be phase coherency across the groups at the output of the shift registers 154 and 154X. However, if the output assignment switch 162 (FIG. 9) was temporarily changed to select silence, there is a possibility that the outputs of the shift registers 154 will no longer be phase coherent with the outputs of the shift registers 154X because the AES FIFOs $158_A$ and $158_B$ will likely contain a different number of samples from the AES FIFOs 158X. The depacketizers 134 and 134X are able to restore phase coherency by periodically forcing each AES FIFO to a preselected depth. The depacketizer tests the depth of each AES FIFO periodically (each 1920 samples in the case of 625 line format or 8008 samples in the case of 525 line format) and repeats or drops a sample if the depth is too small or too great. Phase coherency is restored within a few seconds after a change in the setting of the group assignment switch and with minimal impact on the integrity of the audio signal.

There are other possibilities for disturbing phase it coherency, and switching a group assignment switch to select silence is just one example.

The video processors 4 and 104 and the audio processors 8, 8X, 108 and 108X may be implemented using field programmable gate arrays. A person skilled in the art is able to program a field programmable gate array to perform the functions described above.

The disembedder and the disembedder expansion device always provide a 48 KHz AES data stream regardless of input. This ensures that downstream AES receivers remain phase-locked even if the input to the disembedder is changed or the user alters the setting of one or more of the output assignment switches.

It will be appreciated that the invention is not restricted to the particular embodiment that has been described and illustrated, and that variations may be made therein without departing from the scope of the invention as defined in the appended claims and equivalents thereof. For example, it will be appreciated that although the AES signals supplied to the AES receivers $46_A$–$46_H$ are at 48 kHz, AES signals that are to be embedded and have different sampling rates from 48 kHz can be converted to 48 kHz data streams by converting to analog form and resampling at 48 kHz, or by use of digital signal processing techniques. Further, although the foregoing description is based on each audio group being composed of two AES data streams, those skilled in the art will recall that under SMPTE 272, an audio group could consist of only one AES data stream.

What is claimed is:

1. A method of embedding ancillary data in an ancillary data space of a serial digital interface video stream, wherein each line of the video stream is composed of a horizontal ancillary data space followed by an active interval, said method comprising:

during the horizontal ancillary space of line n of the video stream, reading all data from a video FIFO, whereby at the start of the active interval of line n+1 of the video stream the video FIFO contains no data, during the active interval of line n, preparing an ancillary data packet and loading the data packet into the video FIFO, during the horizontal ancillary data space of line n+1 of the video stream, reading all data from the video FIFO and inserting the ancillary data packet into the horizontal ancillary data space of line n+1, whereby at the start of the active interval of line n+2 of the video stream the video FIFO contains no data.

2. A method of embedding ancillary data in the horizontal ancillary data space of a serial digital video stream, wherein each line of the video stream is composed of a horizontal ancillary data space followed by an active interval, said method comprising:

receiving the input serial digital video stream, detecting whether ancillary data is embedded in the horizontal ancillary data space of the input serial digital video stream, if no ancillary data is embedded in the input serial digital video stream, embedding ancillary data in the serial digital video stream, if ancillary data is embedded in the input serial digital video stream, operating either in a cascade mode or in an originate mode, and wherein operating in the originate mode includes the step of embedding ancillary data in the horizontal ancillary data space of the serial digital video stream by overwriting data in the input serial digital video stream, and operating in the cascade mode includes the step of embedding ancillary data in the serial digital video stream without overwriting data in the input serial digital video stream.

* * * * *